United States Patent [19]

McGuire

[11] 3,942,232
[45] Mar. 9, 1976

[54] VENT STRUCTURE FABRICATION METHOD

[75] Inventor: Joseph C. McGuire, Kennewick, Wash.

[73] Assignee: McDonnell Douglas Corporation, Long Beach, Calif.

[22] Filed: Feb. 11, 1974

[21] Appl. No.: 441,589

Related U.S. Application Data

[62] Division of Ser. No. 376,527, July 5, 1973, Pat. No. 3,803,816.

[52] U.S. Cl................. 29/157 C; 29/157 R; 29/505; 29/508; 29/517; 29/521; 29/525; 55/477
[51] Int. Cl.²............................................ G21C 7/10
[58] Field of Search 29/157 R, 157.6, 158, 163.5 F, 29/419, 422, 423, 435, 505, 515, 517, 521, 525, 508; 55/267, 385, 482, 486–489, 525, 527, DIG. 9, 477; 138/42, 140, 147, DIG. 8, DIG. 11; 220/44 A; 176/68, 86 R; 72/367, 369; 300/21; 227/79

[56] References Cited
UNITED STATES PATENTS

| | | | |
|---|---|---|---|
| 2,269,839 | 1/1942 | Young | 29/505 |
| 2,495,314 | 1/1950 | Caldwell | 29/157 R |
| 2,516,930 | 8/1950 | Varian | 29/423 X |
| 3,258,955 | 7/1966 | Lindsay | 29/157 R X |
| 3,362,061 | 1/1968 | Krasnitz | 29/157 R X |
| 3,411,195 | 11/1968 | Himstedt | 29/157 R |
| 3,813,287 | 5/1974 | Malang | 176/68 |

Primary Examiner—C. W. Lanham
Assistant Examiner—Joseph A. Walkowski
Attorney, Agent, or Firm—D. N. Jeu; Walter J. Jason; Donald L. Royer

[57] ABSTRACT

A vent structure for reliable long term operation at high temperatures is fabricated by annealing a tubing of predetermined length and size, placing a predetermined number of strands of stabilized zirconium oxide yarn of predetermined diameter longitudinally into one end of the tubing a predetermined distance therein, flattening and coiling and pressing the end portion of the tubing containing the yarn at predetermined pressures, annealing the formed tubing, and installing a particulate filter in the undeformed (normally lower) portion of the tubing. For use in venting helium generating reactor control pins located under hot molten sodium, a vent assembly including the vent structure and providing an air lock between the outer molten sodium and the vent is affixed to the upper end of each control pin.

10 Claims, 7 Drawing Figures

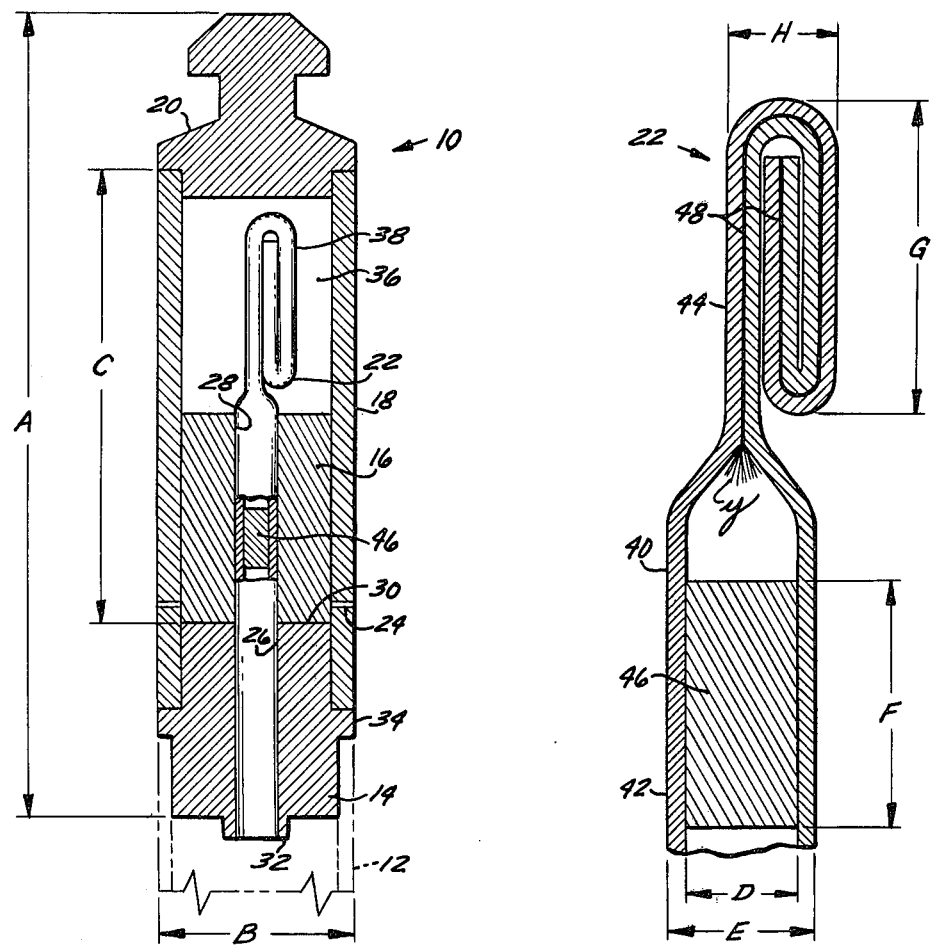

VENT STRUCTURE FABRICATION METHOD

This is a division of application Ser. No. 376,527, filed July 5, 1973, now U.S. Pat. No. 3,803,816.

BACKGROUND OF THE INVENTION

My present invention pertains generally to venting devices. More particularly, the invention relates to a very effective and practical vent structure for use in the control pins of a liquid metal fast breeder reactor (LMFBR), for example, and to a novel method of fabricating the vent structure.

As is well known, helium (He) is generated in the LMFBR control pins as the result of a neutron, alpha $(n, \alpha)$ reaction on boron (B). This helium is generated in each pin up to the rate of 3 cc/hr or 72 cc/day volume at standard temperature and pressure (STP). If all of this generated gas is released from the boron carbide ($B_6C$) matrix of a control pin, the resulting 26 liters per year poses a serious containment and pressure problem using closed control pins, especially since sudden onsets of extreme pressure could develop during the reactor power cycles. Conversely, the use of open control pins allows the boron carbide to come into direct contact with the high temperature sodium (Na) liquid metal coolant with the resulting attack thereon and likelihood of boron contamination of the coolant.

A suitable vent structure for use with a reactor control pin is shown, described and claimed by the inventor in his copending United States patent application Ser. No. 296,680 filed on Oct. 11, 1972, now U.S. Pat. No. 3,876,403 for Vent Assembly. While such disclosed vent structure is entirely satisfactory, an improved vent structure providing a more precise flow pattern therethrough, and which structure can be more easily fabricated to produce an accurate predetermined flow, is desirable and useful in certain applications.

SUMMARY OF THE INVENTION

Briefly, and in general terms, my invention is preferably accomplished by providing a vent structure, including a ductile and relatively thin wall tubing having an undeformed normally lower portion and a flattened and folded (doubly coiled and pressed) normally upper portion, in a molten sodium coolant reactor gas generating control pin, for example, to release its generated gas normally at a relatively low flow rate such that the control pin (gas container) is maintained in a slightly pressurized state to prevent backflow of molten sodium or vapor and consequential contamination thereof. The formed (flattened and folded) upper portion of the vent structure preferably includes a thin layer of stabilized zirconium oxide yarn between the flattened opposing faces inside the tubing, to provide a controlled gas flow therethrough and prevent the vent from sintering together due to grain growth across the faces occurring at high temperatures and long term operation. The vent structure preferably further includes a particulate filter in the undeformed lower portion of the vent tubing.

The method of fabricating the vent structure includes the steps, among others, of annealing a metal tubing of predetermined length and size at a predetermined temperature for a predetermined period, placing a predetermined number of strands (of predetermined diameter) of suitably stabilized zirconium oxide (i.e., zirconium dioxide $ZrO_2$) yarn longitudinally into one end of the tubing a predetermined distance therein, flattening the end portion of the tubing containing the yarn and then coiling and pressing such end portion at predetermined pressures, and again annealing the tubing at a predetermined temperature for a predetermined period. Finally, a porous metal particulate filter can be press-fitted into the undeformed (normally lower) portion of the tubing. The resultant vent structure is structurally stable and can operate reliably in a high temperature environment over a long term, and gas flow thereof is substantially a linear function of the applied gas pressure differential up to the point where the elastic limit of the metal tubing is reached.

For use in venting helium generating reactor control pins located under a corrosive and reactive liquid environment such as molten sodium, a vent assembly including the vent structure and providing an air lock between the outer molten sodium and vent structure is attached to each pin to ensure that liquid sodium does not directly contact the vent. The vent assembly includes an adapter plug mounting the lower end of the vent structure, cover structure attached to the plug and forming an air lock chamber housing the part of the vent structure above the plug, and a baffle made of porous metal provided in the chamber space between the upper portion of the vent structure and a number of small bleed holes in the cover structure. The adapter plug is shaped to be suitably attached to the upper end of a control pin, and the baffle allows free passage of gas while preventing the passage of particulate matter and impeding the passage of molten sodium. The possibility of sodium backflow is virtually eliminated by use of the air lock and the anti-splash porous metal baffle.

BRIEF DESCRIPTION OF THE DRAWINGS

My invention will be more fully understood, and other advantages and features thereof will become apparent, from the following description of an exemplary embodiment and fabrication method of the invention. The description is to be taken in conjunction with the accompanying drawings, in which:

FIG. 1 is an elevational view, shown in section, of a vent assembly which is to be affixed to the normally upper end of a reactor control pin;

FIG. 2 is a fragmentary elevational view, shown in section and enlarged, of a vent structure constructed according to this invention; and FIGS. 3A, 3B, 3C, 3D and 3E illustrate certain main steps in a method of fabricating the vent structure.

DESCRIPTION OF THE PRESENT EMBODIMENT AND METHOD

Figure 3C:
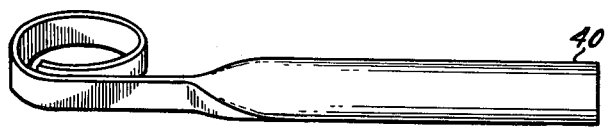
Figure 3D:
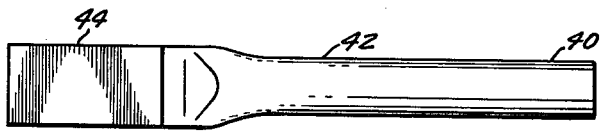

In the following description and accompanying drawings of an illustrative embodiment and fabrication method of my invention, some specific dimensions and types of materials are disclosed. It is to be understood, of course, that such dimensions and types of materials are given as examples only and are not intended to limit the scope of this invention in any manner.

FIG. 1 is an elevational view, shown in section, of the upper vent assembly 10 of a control pin 12 which is used, for example, in a liquid metal (sodium) cooled fast breeder nuclear reactor (not shown). The control pin 12 and its upper vent assembly 10 are normally fully immersed deeply in (under approximately 8 feet of) the molten sodium reactor coolant operating at temperatures of about 900° to 1100°F. Each control pin 12 contains a series of boron carbide pellets (not shown) and is a source of generated helium. The vent assembly 10 is, of course, hermetically attached to the upper end of the control pin 12 and generally includes a vent adapter plug 14, baffle 16, air lock tube 18, air lock cap 20, and vent structure 22.

The vent plug 14, air lock tube 18, and air lock cap 20 are preferably made of a material similar to that of the control pin 12 structural material such as Type 316 stainless steel, which is compatible with a hot sodium (liquid and vapor) environment. Baffle 16 is made of a porous metal which is resistant to attack by hot sodium. A felt or foam metal can be used and, in the exemplary vent assembly 10, a Type F-315 nickel felt metal produced by Huyck Metals Corporation was used. This material is about 20% dense and allows free passage of gas while preventing the passage of particulate matter and impeding any passage of molten sodium.

The air lock tube 18 has, for example, four vent or bleed holes 24 which can be 0.0135 inch in diameter equiangularly spaced 90° about the air lock tube at a predetermined distance above the lower end thereof. The vent plug 14 has an axially drilled central hole 26 and the baffle 16 also has an axially punched central hole 28. The punched baffle 16 is packed on the vent structure 22 against the upper surface 30 of vent plug 14 which is joined at its lower end 32 to the lower end of the vent structure by a standing lip electron-beam weld for maximum cleanliness and minimal disturbance of the surrounding metal.

When the lower end of the air lock tub 18 is welded to flange 34 of the vent plug 14, the vent holes 24 are located slightly above the upper surface 30 of the vent plug and directly adjacent to the lower side surface of the baffle 16. Welding of the air lock cap 20 to the upper end of the air lock tube 18 forms an air lock chamber 36 containing cover gas which provides an "air lock" effect over the vent structure 22 such that liquid sodium does not directly or normally contact the upper vent end 38. The possibility of sodium backflow is virtually eliminated by use of the air lock chamber 36 and the anti-splash porous metal baffle 16 in the vent assembly 10 of control pin 12.

The air lock chamber 36 is a plenum chamber which is made large enough to provide a sufficient reservoir of gas that prevents liquid sodium which might enter the lower bleed holes 24 and into the baffle 16, as in the event of any sudden fluctuation (loss) in gas pressure due to a temporary reactor temperature change (drop), from ever reaching the vent opening in the upper portion 44 of the vent structure 22. Of course, the sodium is subsequently forced out of the chamber 36 following the temperature change as the gas pressure therein builds up to equalize with the environmental (8 feet of liquid sodium) pressure.

The bleed holes 24 are made adequately small so that they will not admit the surge of liquid sodium into the air lock chamber 36, which surge can occur when the control pin 12 is first immersed in the sodium. On the other hand, the bleed holes 24 are made adequately large mainly for convenience of drilling very small holes in stainless steel with the presently available drills and methods. In any event, the combined size of the bleed holes 24 must be about equal or (and are vastly) larger than the effective size of the vent discharge opening in the upper portion 44 of the vent structure 22, and allows gas to escape from the chamber 36 at about the rate that it is being released from the vent structure.

The vent assembly 10 has general overall dimensions of length A, diameter B, and an approximate gas space length C (connected through vent holes 24 to the exterior). Illustrative values for these dimensions are A of 1.80 inches, B of 0.435 inch (maximum), and C of 0.95 inch, for example. This vent assembly 10 is, of course, to be welded to the upper end of the stainless steel tube (control pin 12) having a 0.395 inch inside diameter which accommodates the lower portion of vent plug 14. Other dimensions of the vent assembly 10 can be proportionately estimated adequately from the elevational view of FIG. 1 and, while approximate, will suffice for most purposes. The vent has a gas flow rate sufficient to maintain pressure in the air lock chamber 36 and in control pin 12 to prevent backflow of sodium and any possibly contaminating outside cover gas, respectively.

FIG. 2 is a fragmentary elevational view, shown somewhat enlarged in section, of the vent structure 22. The vent structure 22 includes a thin wall tubing 40 having an undeformed lower portion 42, and a flattened and folded (coiled or rolled and pressed) upper portion 44. The flattened upper portion 44 is preferably folded at least twice, as shown. A particulate filter 46 is provided in the lower portion 42 of the tubing 40, and a layer 48 of stabilized zirconium oxide yarn is provided between the pressed opposing surfaces inside the upper portion 44. The tubing 40 can be made of any material sufficiently ductile to survive the flattening, coiling and pressing operations without cracking, and there are appropriate materials readily available for operation or use under a very wide range of environmental and temperature conditions.

In the interests of compatibility and uniformity, the tubing 40 can be made of the same material as the control pin 12 structural material. Thus, the tubing 40 can be made of Type 316 stainless steel having an inside diameter D and an outside diameter E as indicated in FIG. 2. Likewise, the particulate filter 46 can be made of Type F-315 nickel felt metal similar to that of baffle 16 (FIG. 1) and having a length F. The cylindrically shaped filter 46 can be installed in the lower portion 42 by press-fitting it into the tubing 40 to a position approximately as illustrated. Exemplary dimensions for the inside diameter D, outside diameter E, and length F are respectively 0.093, 0.125, and 0.250 inch, for example.

The formed upper portion 44 of the exemplary vent structure 22 has a length G and a thickness H as indicated in FIG. 2. The layer 48 can consist essentially of, for example, compacted 0.015 inch diameter strands of 8% yttrium oxide ($Y_2O_3$) stabilized zirconium oxide ($ZrO_2$) ceramic yarn. This strand size facilitates installation in a relatively wide range of sizes of the tubing 40 and is not a critical dimension. It can be made larger or smaller according to the particular tubing 40 size range involved. The strand size is, for example, preferably smaller with a smaller tubing 40 so that the strands can be easily and uniformly installed therein. This will result in a continuous, even and homogeneous layer 48 of compacted ceramic yarn after pressing. Thus, the use of ceramic yarn strands provides ease of fabrication, and a more reproducible vent structure 22 is accurately and consistently obtained. The yttrium oxide or yttria stabilizer serves to prevent brittleness of the zirconium oxide or zirconia yarn in an oxidizing atmosphere.

Illustrative dimensions for the length G and thickness H are respectively about 0.350 and 0.092 inch, for example. The thickness of the layer 48 can be approximately 0.003 inch, when pressed, although the layer thickness in the exemplary vent structure 22 can be generally between 0.002 and 0.005 inch for satisfactory operation. Exact pressing parameters and anneal conditions are functions of the particular size and wall thickness of the tubing 40 used and the desired gas flow rate. A layer 48 thickness less than approximately 0.002 inch may not prevent eventual grain growth across the proximate faces of a pressed tube at high temperatures. Thus, in regular long term and high temperature operation, it is possible for the formed upper portion 44 of the vent structure to sinter together with too thin a layer 48. Note that the formed vent structure 22, with or without the layer 48 of stabilized zirconium oxide yarn, can be used independently as a gas flow metering device in various applications following suitable flow calibration thereof.

It may be noted that a substantially linear relationship exists in the response in helium flow rate of the vent structure 22 to change in helium pressure, and helium flow rate drops linearly as the driving pressure decreases. Flow rate is, of course, lower at the higher temperatures since there are less gas molecules in a fixed volume at such temperatures with the maintained pressure differential. With the helium generation rate per control pin 12 (FIG. 1) at approximately 3 cc/hr, for example, the vent structure 22 provides an average helium diffusion rate of about 0.6 cc/hr at one atmosphere pressure differential after 60 thermal cycles. This allows a helium pressure of approximately 4 atmospheres inside the control pin 12 to provide a two-fold advantage. First, pressurized helium has a higher thermal conductivity to dissipate radiation heating in the control pin and, second, the pressure minimizes any possibility of back diffusion of either sodium vapor or cover gas into the control pin. The positive helium pressure maintained in the control pin 12 by the vent structure 22 can drop by a factor of about 2 without compromising the sodium seal provided.

FIGS. 3A through 3E illustrate certain main steps in the method of fabricating the vent structure 22. In FIG. 3A, following ultrasonic inspection of a Type 316 stainless steel tubing 40 of 0.125 O.D. and 0.016 inch wall, the tubing is cut to a predetermined length and vacuum annealed 15 minutes at 1900°F, for example. Austenitic stainless steel is virtually unaffected by pure hot sodium at temperatures below 1000°F. In the region between 1000° and 1500°F, however, there is evidence of some measurable attack, particularly at the grain boundaries. Based on this constraint, the vent tubing 40 wall thickness was selected to be 0.016 inch to provide a safety factor of at least 3 over the deepest sodium penetration observed at 1500°F. The annealed tubing 40 is then uniformly filled loosely with, for example, 8 strands S of stabilized zirconium oxide yarn y. Each strand is 0.015 inch in diameter, in this instance. It is not critical that the tubing 40 be very uniformly filled. The yarn y can be Zircar type ceramic yarn produced by Union Carbide, for example. Each strand of Zircar type yarn consists of two plies and each ply contains 720 continuous fibers of stabilized zirconium oxide.

A predetermined length of the filled tubing 40 is next flattened in, for example, a Carver hydraulic press at a predetermined flattening pressure. The 8 strands S of yarn y press into the lower 48 approximately 0.003 inch thick containing 11,520 substantially parallel passages. The flattened tubing 40 is illustrated in FIG. 3B. The excess yarn is trimmed off and the flattened portion of tubing 40 is then formed by rolling it into a two-bend spiral as shown in FIG. 3C, and a final pressing operation is performed thereon at a predetermined pressing pressure. This produces the configuration illustrated in FIGS. 3D and 3E and which creates a flat tortuous path for the escaping gas. Of course, instead of a two-bend spiral, a two-bend Z configuration can be formed for final pressing.

Figure 3E:
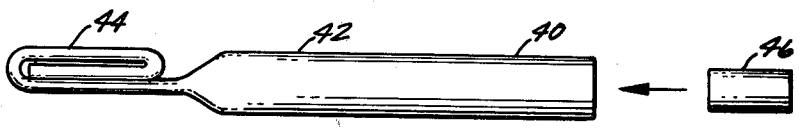

The compacted ceramic yarn throughout the vent wall interface eliminate the operational sintering tendency due to grain growth across the faces of the flattened tubing 40 at high temperatures. The formed tubing 40 is then preferably vacuum annealed 15 minutes at 1900°F again. A particulate filter 46 is finally press-fitted into the formed tubing 40 as indicated in FIG. 3E to complete the vent structure 22. The formed tubing 40 is preferably annealed particularly where the vent structure 22 is used in high temperature (600°C or 1112°F) operation because flow rate doubles in the vent structure going from a stressed to annealed condition and operating at the high temperature of 600°C, the vent will self-anneal over a period of approximately 3 weeks.

Although any ceramic yarn compatible with the operating environment can be used in the vent structure 22, the stabilized zirconium oxide yarn is compatible with any vent tubing material and is well suited for operation in the presence of hot sodium vapor. It is a very stable oxide and is resistant to attack by hot sodium and sodium vapor. As mentioned previously, however, exact pressing parameters (and annealing conditions) are a function of the particular size and wall thickness of the vent tubing used and the desired gas flow rate. In the flattening and pressing operations required on the particular vent tubing 40 of 0.125 inch O.D. and 0.016 inch wall, gas flow rate at 15 psi differential pressure is illustratively varied according to flattening and pressing pressures generally as indicated below.

| Flattening Pressure (psi) | Pressing Pressure (psi) | Flow Rate (at 15 psi $\Delta$ P) |
|---|---|---|
| 1000 | 500 | 6 cc/hr |
| 1000 | 1000 | 3 cc/hr |
| 2000 | 2000 | 1 cc/hr |
| 4000 | 4000 | 0.2 cc/hr |

It was previously noted that a strand of Zircar type yarn consists of two plies wherein each ply contains 720 continuous fibers of stabilized zirconium oxide. In the tubing 40, 8 strands S of the ceramic yarn y were pressed into a layer 48 approximately 0.003 inch thick containing 11,520 parallel passages. It is, therefore, evident that helium flow rate through the vent structure 22 is also dependent upon the size of the continuous yarn fibers. Generally, for similar flattening and pressing pressures, the use of larger fibers produce a higher flow rate and the use of smaller fibers produce a lower one. Thus, it is possible by correct choice of fiber size and pressing parameters to produce vents of widely differing gas flow characteristics. The pore diameter of the parallel passages is so small compared to the length of the continuous fibers and strand plies that such passages are effectively parallel even though the plies are twisted and possibly installed crookedly in the tubing 40. There is also some belief that after pressing, annealing and use of the vent structure 22, the ceramic yarn fibers actually become essentially fused integrally together with only microscopic remanent passages left. In any event, a highly effective vent structure 22 is obtained to provide selective release of helium but not any contaminant vapors and the like.

By changes in ceramic yarn fiber sizes and pressing pressures and techniques, the vent structure 22 can be fabricated for any required flow down to, for example, 0.003 cc/hr helium at one atmosphere pressure differential. Also, flow through the vent structure 22 can increase greatly in case of a sudden increase in helium pressure within the control pin 12. Thus, the vent structure 22 effectively acts to relieve pressure transients in the control pin 12 to prevent any possible ruptures thereof and then returns by natural springback to normal operation if the elastic limit of the formed tubing 40 has not been exceeded. The illustrative vent structure 22 has been tested and found good to over 3500 psi, for example. While the doubly folded, formed tubing 40 does not actually unroll in order to relieve high increases in pressure, it tends to do so. This was substantiated in testing a vent structure 22 with increasing pressure until it burst at a very high pressure, when the formed tubing 40 did unroll to some extent.

The vent structure 22 is, for example, produced for operation in a hostile environment including high purity molten sodium at 600°C and a radiation fluence level of $10^{20}$ to $10^{22}$ nvt (neutron density-velocity-time or neutrons/cm$^2$) with an average neutron energy of 70.1 Mev (million electron volts). Because of the production of lithium as a result of the (neutron, alpha) reaction on boron carbide and the possibility of boron carbide disintegration under irradiation, the unpressed section (lower portion 42 in FIG. 2) of tubing 40 can include the particulate filter 46 which allows free passage of gas. To produce the particulate filter 46, nickel felt metal can be used. A filter disc or discs of appropriate size can be punched out from the nickel felt metal. Of course, a foamed instead of felt metal can be used and the metal can be stainless steel instead of nickel, for example, since such materials are resistant to attack by hot sodium and allow free passage of gas.

Baffle 16 can be fabricated from stainless steel foam metal. This baffle material can, of course, be nickel instead of stainless steel and felt instead of foam metal. Indeed, it is usually convenient and preferable that the baffle 16 and filter 46 be made of the same identical material. The foam metal is punched or otherwise shaped to size and configuration. In similar manner, the vent adapter plug 14, air lock tube 18 and air lock cap 20 can be shaped from a Type 316 stainless steel rod. The plug 14, tube 18 and cap 20 can be machined to size and shape from the stainless steel rod.

The particulate filter 46 is packed into the formed tubing 40 to complete vent structure 22 and the baffle 16 is packed onto the formed tubing. The adapter plug 14 is then installed on the vent structure 22 against the lower surface of the baffle 16 and is joined at its lower end 32 to the lower end of the vent structure by a standing lip electron-beam weld, for example. A helium leak check is next made of the electron-beam weld, and the air lock cap 20 is tungsten-inert-gas (TIG) or electron-beam welded to the air lock tube 18 with its vent holes 24 (FIG. 1). The air lock tube 18 is finally TIG welded to flange 34 of the adapter plug 14 to complete the vent assembly 10.

While an exemplary embodiment and method of this invention have been described above and shown in the accompanying drawings, it is to be understod that such embodiment and method are merely illustrative of, and not restrictive on, the broad invention and that I do not desire to be limited in my invention to the specific constructions or arrangements or steps shown and described, for various obvious modifications may occur to persons having ordinary skill in the art.

I claim:

1. A method of fabricating a vent structure, which comprises the steps of:
   installing a predetermined amount of yarn in a normally upper portion of a tubing of predetermined length and size;
   flattening said upper tubing portion at a predetermined flattening pressure, said yarn being compressed between opposing faces of said flattened tubing portion;
   coiling said flattened tubing portion against itself; and
   pressing diametrically to flatten said coiled tubing portion at a predetermined pressing pressure whereby said vent structure is formed.

2. The invention as defined in claim 1 further comprising the step of annealing said vent structure at a predetermined high temperature for a predetermined period to bring it from a stressed to annealed condition after pressing of said coiled tubing portion.

3. The invention as defined in claim 1 further comprising the step of fitting a particulate filter in the normally lower portion of said tubing after pressing of said coiled tubing portion.

4. The invention as defined in claim 1 wherein said flattened tubing portion is coiled into at least a generally two-bend spiral configuration prior to pressing the same.

5. The invention as defined in claim 1 wherein said yarn includes a relatively large number of generally continuous fibers installed longitudinally in said upper tubing portion prior to flattening thereof.

6. The invention as defined in claim 5 further comprising the step of initially forming strands from said fibers, a predetermined number of said strands being installed longitudinally in said upper tubing portion prior to flattening thereof.

7. The invention as defined in claim 6 further comprising the step of trimming off excess lengths of said strands extending outside of said upper tubing portion after flattening and before coiling thereof.

8. The invention as defined in claim 5 further comprising the step of annealing said vent structure at a predetermined high temperature for a predetermined period to bring it from a stressed to annealed condition after pressing of said coiled tubing portion.

9. The invention as defined in claim 8 further comprising the step of press-fitting a particulate filter in the normally lower portion of said tubing after annealing of said vent structure.

10. The invention as defined in claim 9 further comprising the step of initially forming strands from said fibers, a predetermined number of said strands being installed longitudinally in said upper tubing portion prior to flattening thereof.

* * * * *